J. F. CHAMPLIN.
Corn-Planter.
No. 56,667.
Patented July 24, 1866.
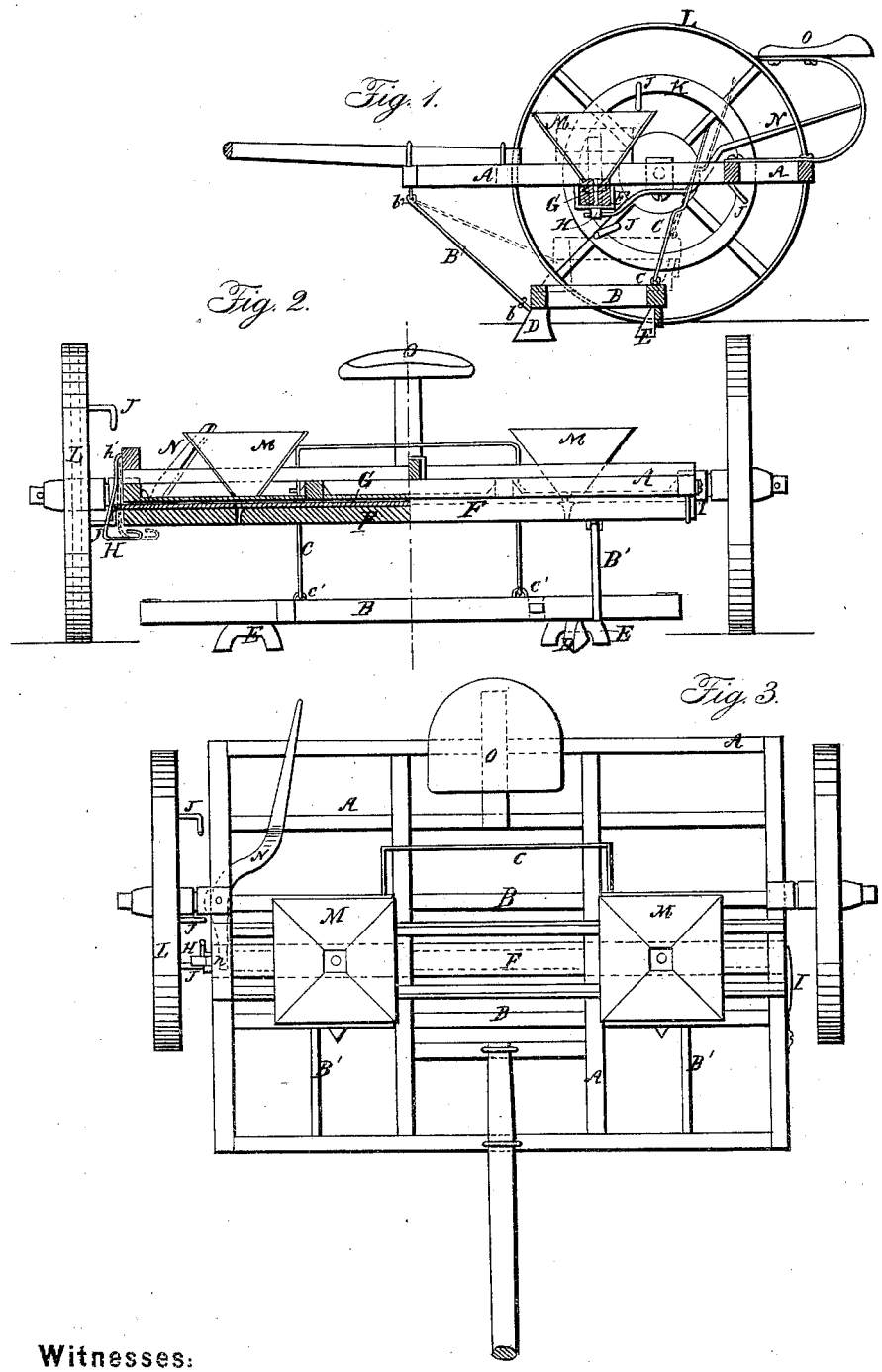

UNITED STATES PATENT OFFICE.

J. F. CHAMPLIN, OF AURORA, NEW YORK, ASSIGNOR TO HIMSELF AND
S. B. THOMSON AND D. C. CORBIN.

IMPROVEMENT IN CORN-PLANTERS.

Specification forming part of Letters Patent No. 56,667, dated July 24, 1866.

*To all whom it may concern:*

Be it known that I, JUSTIN F. CHAMPLIN, of the town of Aurora, county of Erie, and State of New York, assignor to SYLVANUS B. THOMSON, DE WITT C. CORBIN, of the same place, and JUSTIN F. CHAMPLIN (myself,) have invented certain new and useful Improvements in Corn-Planters; and I do hereby declare that the following is a full and clear description thereof, reference being had to the accompanying drawings, making a part of this specification, in which—

Figure I is a vertical section. Fig. II is a sectional front elevation. Fig. III is a top plan.

The nature of this invention relates to the combination and arrangement of its several parts.

Letters of like name and kind refer to like parts in each of the figures.

The main frame of the machine is represented at A, which consists of several timbers of suitable size and strength properly framed together, and B represents the plow-frame. The plow-frame is connected to the main frame by means of the hinged draw-straps B'. These draw-straps are hinged to the front timber of the main frame, as shown at $b^2$, and to the plow-frame, as shown at $b^3$.

A bent rod, C, is hinged to the rear timber of the plow-frame, as shown at $c'$, which projects upward above the main frame, forming a handle, by which the driver may lift the plow-frame up into the position shown by the red lines in Fig. I when it is desirable to move the machine without operating it.

The plows are of ordinary construction, and are shown at D. The coverers, also of ordinary construction, are shown at E.

The planting-box is an oblong box extending to nearly or quite the width of the main frame, and is shown at F. It has within it a slide, G, which I call the "dropping-slide," for the reason that it separates the requisite number of kernels of corn to form a hill from the main body in the hopper, and drops them into the proper place in the furrow for the hill. This slide projects through the planting-box at either end, and is operated or moved back and forth by means of two springs, H and I, one at each end.

The spring H, I call a "cam-spring," for the reason that it serves a double purpose of cam and spring. The spring H is connected to the main frame, as shown at $h'$, and projecting downwardly to give a cam form, so that the lug J, which projects from the rim K of the driving-wheel L, will press upon the cam as the wheel revolves, and move the cam-spring inwardly, and thereby move the slide back against the spring I, setting it in such manner that it will react against the slide and move it quickly in the opposite direction when the lug passes off from the cam-spring. The cam-spring reacts by its own elasticity when the lug passes off, so that the spring I has to exert a power only sufficient to move the slide.

The hoppers for holding and carrying the seed to be planted are shown at M. The cavity in the slide is sufficient to receive the requisite number of kernels for a hill.

When the cam-spring moves the slide so as to bring the cavity of the slide under the aperture at the bottom of the hopper, it is filled with the requisite number of kernels for a hill. Then the spring I quickly moves the slide in the opposite direction, bringing the cavity of the slide over the aperture through the bottom of the planting-box, through which the kernels in the cavity of the slide fall into the furrow made by the plow, forming a hill, the coverer as it passes refilling the furrow and covering the seed to the proper depth.

Two, three, or more rows may be planted at the same time by adding to the machine two or more hoppers and using the proper slides therefor.

Different slides will be used to correspond with the kind of seed to be planted.

Two or more lugs may be used on the rim K. These lugs determine the distance between the hills, and the hoppers and slide determine the distance between the rows.

The lever N is connected with the cam-spring H in such manner that the cam-spring by it may be moved inwardly beyond the touch of the lugs J, so that the machine may be moved without operating the slide or dropping any seed.

This machine is calculated for planting corn, beans, or other similar seeds in hills and rows.

O represents the driver's seat, which is so placed on the rear of the frame as to balance the machine and lessen the pressure of the downward pull of the plows upon the horses' necks.

What I claim as my invention, and desire to secure by Letters Patent, is—

1. The combination of the cam-spring H, lugs J, and spring I, for the purpose of operating the slide G, substantially as described.

2. The arrangement of the lever N, in connection with the cam-spring H, for the purpose of moving the cam-spring beyond the touch of the lugs J when desired, substantially as described.

3. In a machine for planting corn in hills in which the plow-frame is made separate from the main supporting-frame, suspending the plow-frame under the main frame by means of a pendent hinged connection to the forward end of the main frame, in combination with a rear upward-projecting bail or handle in near proximity to the driver's seat, so that the driver can conveniently lift and suspend the plows from the ground when turning round at the end of the rows, or otherwise, and again drop the plows to the ground as required, substantially as described.

JUSTIN F. CHAMPLIN.

Witnesses:
E. B. FORBUSH,
B. H. MUEHLE.